United States Patent
Sasaki (10) Patent No.: US 10,447,881 B2
(45) Date of Patent: Oct. 15, 2019

(54) IMAGE FORMING APPARATUS, IMAGE FORMING METHOD, AND RECORDING MEDIUM, FOR EXTENDING IMAGE PROCESSING FUNCTIONALITY

(71) Applicant: CANON KABUSHIKI KAISHA, Tokyo (JP)

(72) Inventor: Yuto Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,044

(22) Filed: Jul. 24, 2017

(65) Prior Publication Data
US 2018/0034997 A1 Feb. 1, 2018

(30) Foreign Application Priority Data

Jul. 26, 2016 (JP) .................................. 2016-146628
Jul. 20, 2017 (JP) .................................. 2017-140829

(51) Int. Cl.
*H04N 1/00* (2006.01)

(52) U.S. Cl.
CPC ....... *H04N 1/00941* (2013.01); *H04N 1/0097* (2013.01); *H04N 1/00965* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2005/0141012 A1 | 6/2005 | Oomura | |
| 2007/0008573 A1 | 1/2007 | Yamada | |
| 2009/0251713 A1 | 10/2009 | Funane | |
| 2011/0058205 A1* | 3/2011 | Araki | G06F 3/1203 358/1.13 |
| 2011/0295695 A1* | 12/2011 | Ishihara | G06Q 30/0269 705/14.66 |
| 2012/0147411 A1* | 6/2012 | Mori | G06F 3/1205 358/1.14 |
| 2013/0016393 A1 | 1/2013 | Oku | |
| 2013/0063772 A1 | 3/2013 | Bae | |

FOREIGN PATENT DOCUMENTS

CN 102349070 A 2/2012
JP 2006048725 A 2/2006

* cited by examiner

*Primary Examiner* — Thomas D Lee
(74) *Attorney, Agent, or Firm* — Canon U.S.A., Inc. IP Division

(57) ABSTRACT

An image forming apparatus includes a storage unit configured to store a device control application for causing the image forming apparatus to carry out a job, a storage control unit configured to perform control for causing the storage unit to store an image processing plug-in application for extending the device control application, and a processing unit configured to execute the image processing plug-in application in conjunction with execution of the device control application.

6 Claims, 10 Drawing Sheets

IMAGE FORMING APPARATUS, IMAGE FORMING METHOD, AND RECORDING MEDIUM, FOR EXTENDING IMAGE PROCESSING FUNCTIONALITY

BACKGROUND

Field

The present disclosure relates to an image forming apparatus, an image forming method, and a program, and, in particular, to a technique for carrying out a job by the image forming apparatus.

Description of the Related Art

As a technique for allowing an image forming apparatus to accomplish image processing that is not provided the factory-shipped image forming apparatus, with respect to various kinds of jobs, there has been a technique described in Japanese Patent Application Laid-Open No. 2006-48725. Japanese Patent Application Laid-Open No. 2006-48725 describes a mobile agent providing processing with respect to print data being transferred to an image forming apparatus including a resident agent (a printer control object and an image scanner control object).

However, according to the configuration described in Japanese Patent Application Laid-Open No. 2006-48725, the mobile agent and the resident agent exist independently of one another. As a result, even though the mobile agent and the resident agent can use a common control library, they cannot operate in cooperation with each other.

Therefore, when new image processing is desired to be added as a plug-in to an image forming apparatus, the image processing needs to be added as a new mobile agent separate from the resident agent. However, in this configuration, the new mobile agent cannot allow the image forming apparatus to carry over and use on a screen of the resident agent that a user is familiar with, a user setting already registered with the resident agent, and the like. This technique thus may lead to a reduction in the user's convenience.

SUMMARY

Various embodiments of the present disclosure are directed to allowing new image processing added to an image forming apparatus to be performed using an existing application for carrying out the job. According to various embodiments, an image forming apparatus includes a storage unit configured to store a device control application for causing the image forming apparatus to carry out a job, a memory device that stores a set of instructions, and at least one processor that executes the instructions to perform control for causing the storage unit to store an image processing plug-in application for extending the device control application, and to execute the image processing plug-in application in conjunction with execution of the device control application.

Further features will become apparent from the following description of exemplary embodiments with reference to the attached drawings.

DESCRIPTION OF THE EMBODIMENTS

In the following description, exemplary embodiments will be described with reference to the drawings.

Figure 1:
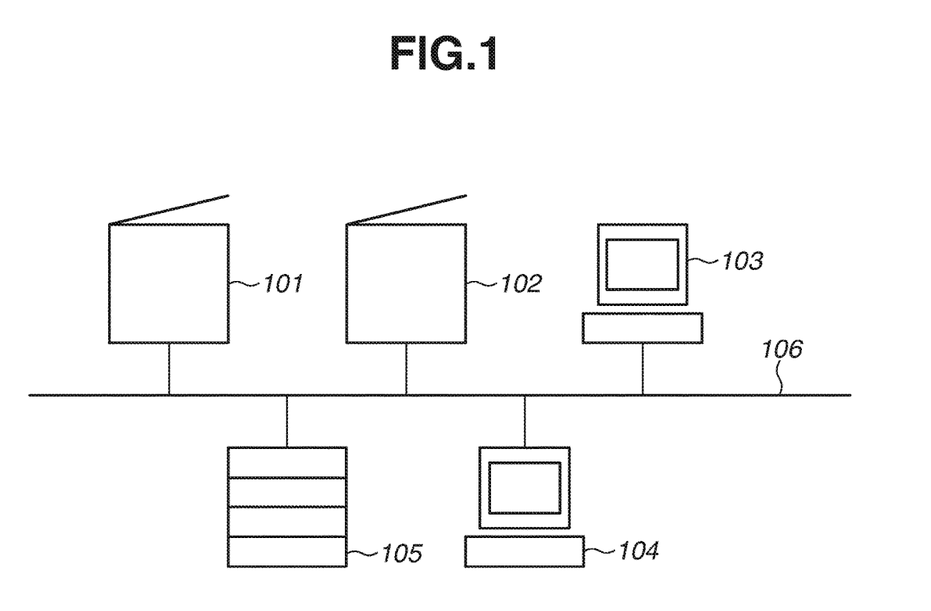
FIG. 1 illustrates a configuration of an image forming system according to one embodiment.

FIG. 1 illustrates an example of a configuration of an image forming system. The image forming system includes image forming apparatuses 101 and 102, information processing terminals 103 and 104, and a server 105. The image forming apparatuses 101 and 102, the information processing terminals 103 and 104, and the server 105 are connected to one another via a network 106, and can communicate with one another. FIG. 1 illustrates the image forming system based on an example in which the image forming system includes the two image forming apparatuses 101 and 102, but the number of image forming apparatuses may be any number (one, or two or more). Further, each of the image forming apparatuses 101 and 102 can be implemented by a same type of apparatus. Therefore, hereinafter, the image forming apparatus will be described, focusing on the image forming apparatus 101 as a representative of the image forming apparatuses 101 and 102 and omitting a detailed description of the image forming apparatus 102. The network 106 may be any network that allows the apparatuses in the image forming system to communicate with one another, such as a local area network (LAN) and the Internet.

The image forming apparatus 101 can print image data by receiving a request to print the image data (print data) from the information processing terminal 103 or 104, read image data using a scanner provided to the image forming apparatus 101, and print the image data read by the scanner. Further, the image forming apparatus 101 can save the print data received from the information processing terminal 103 or 104, and transmit the image read by the scanner of the image forming apparatus 101 to the information processing terminal 103 or 104. Furthermore, the image forming apparatus 101 can perform image processing using the server 105, and print a document stored in the server 105. Besides them, the image forming apparatus 101 can also accomplish functions provided to a known image forming apparatus, such as a multifunction peripheral (MFP).

Figure 2:
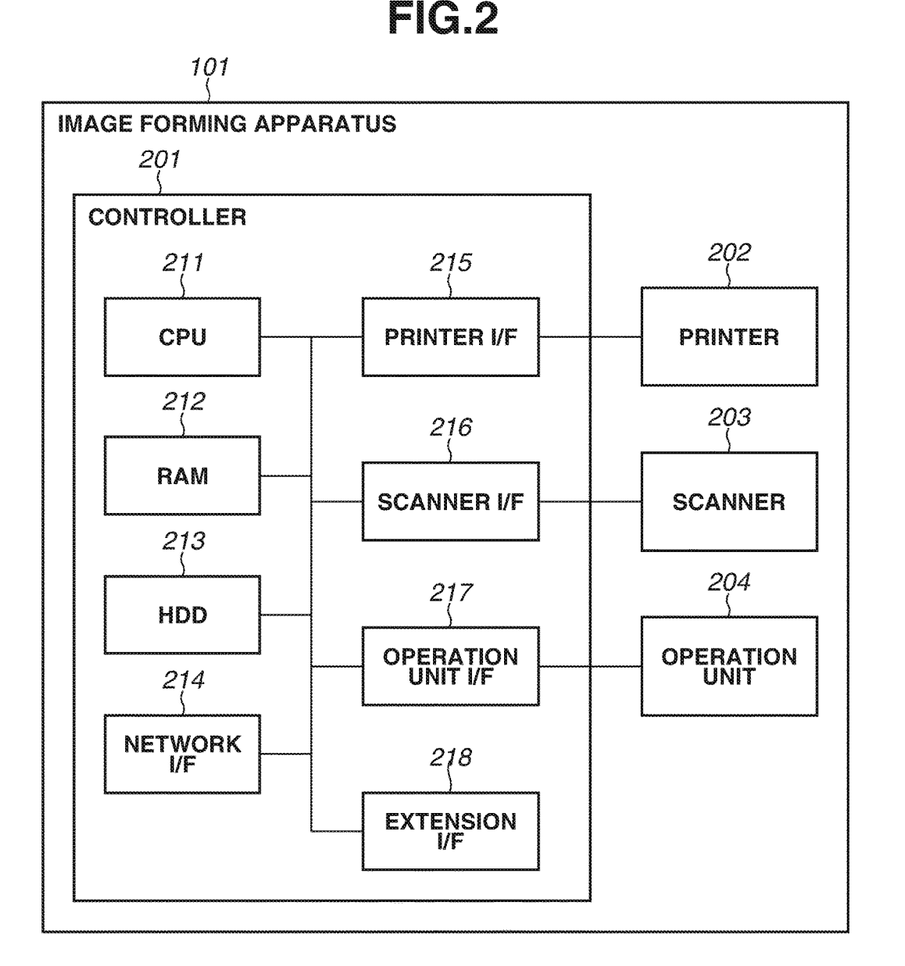
FIG. 2 illustrates a configuration of an image forming apparatus according to one embodiment.

FIG. 2 illustrates an example of a configuration of the image forming apparatus 101.

The image forming apparatus 101 includes a controller 201, printer 202, a scanner 203, and an operation unit 204. The controller 201 includes a central processing unit (CPU) 211, a random access memory (RAM) 212, a hard disk drive (HDD) 213, a network interface (I/F) 214, a printer I/F 215, a scanner I/F 216, an operation unit I/F 217, and an extension I/F 218. The CPU 211 can transmit and receive data to and from the RAM 212, the HDD 213, the network I/F 214, the printer I/F 215, the scanner I/F 216, the operation unit I/F 217, and the extension I/F 218. Further, the CPU 211 loads a command read from the HDD 213 into the RAM 212, and executes the command loaded in the RAM 212.

The HDD 213 can store therein the command executable by the CPU 211, a setting value to be used by the image forming apparatus 101, data regarding processing requested by a user, and the like. The RAM 212 is an area for temporarily storing therein the command read by the CPU 211 from the HDD 213. The RAM 212 can store therein various kinds of data required to execute the command. The network I/F 214 is an interface for carrying out network communication with an apparatus in the image forming system. The network I/F 214 can notify the CPU 211 that data is received, and transmit the data in the RAM 212 to the network 106.

The printer I/F 215 can transfer the print data transmitted from the CPU 211 to the printer 202, and notify the CPU 211 of a state of the printer 202 that is received from the printer 202. The scanner I/F 216 can transfer an instruction to read the image that is transmitted from the CPU 211 to the scanner 203 and then transfer the image data received from the scanner 203 to the CPU 211, and notify the CPU 211 of a state received from the scanner 203.

The operation unit I/F 217 can transmit an instruction from the user that is input via the operation unit 204 to the CPU 211, and transmit image information to be used for an operation of the user to the operation unit 204. The extension I/F 218 is an interface that allows an external device to be connected to the image forming apparatus 101. The extension I/F 218 includes, for example, an interface in the Universal Serial Bus (USB) format. By a connection of an external storage device, such as a USB memory, to the extension I/F 218, the image forming apparatus 101 can read data stored in this external storage device and write data into this external storage device.

The printer 202 can print the image data received from the printer I/F 215 on a sheet, and notify the printer I/F 215 of the state of the printer 202. The scanner 203 can read information on a sheet placed on the scanner 203 itself to digitize the read information and transmit the digitized information to the scanner I/F 216 according to the instruction to read the image that is received from the scanner I/F 216. Further, the scanner 203 can notify the scanner I/F 216 of its own state. The operation unit 204 is an interface for causing the user to perform an operation for issuing various kinds of instructions to the image forming apparatus 101. For example, the operation unit 204 includes a liquid crystal screen equipped with a touch panel, and presents an operation screen to the user and also receives the operation from the user.

Figure 3:
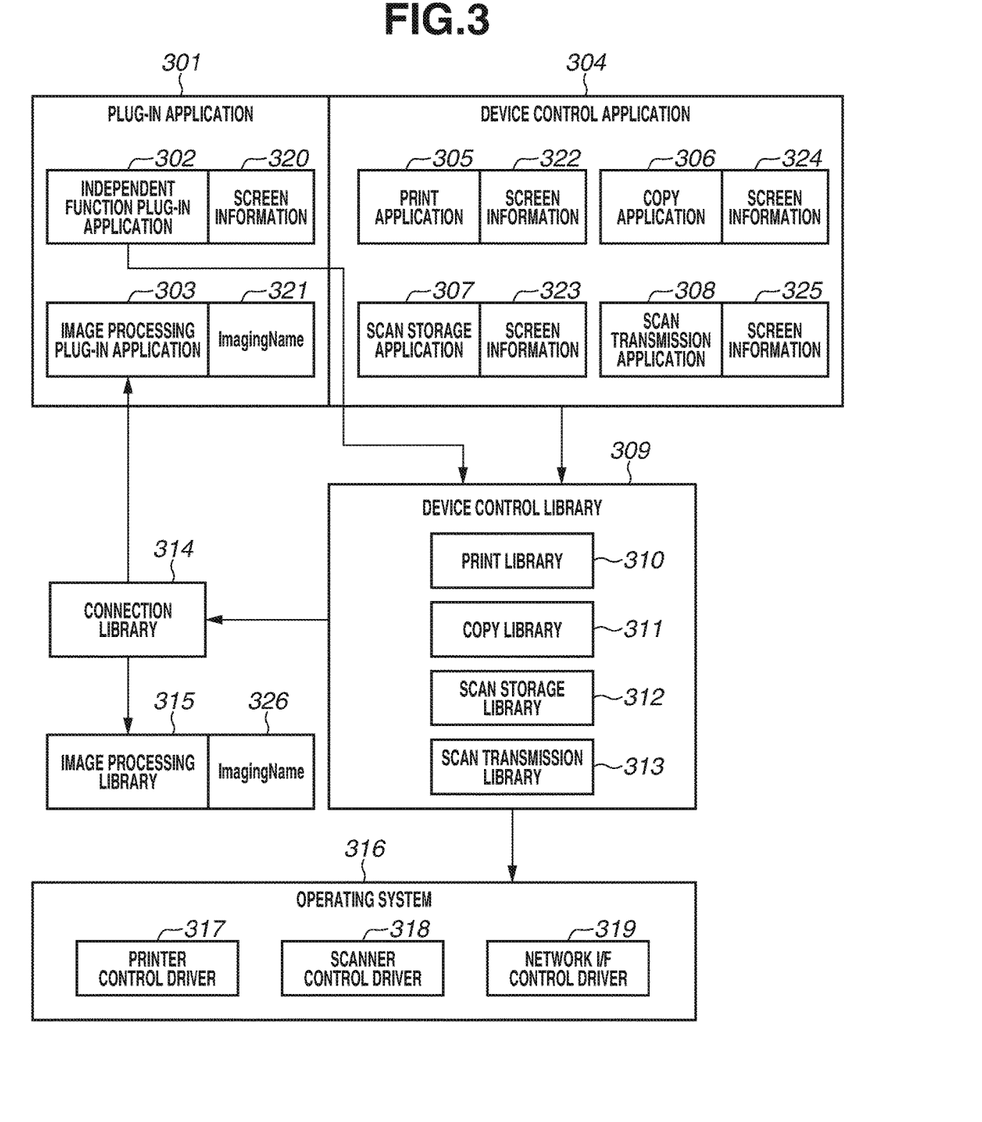
FIG. 3 illustrates a software structure of the image forming apparatus according to a first exemplary embodiment according to one embodiment.

FIG. 3 is a hierarchical diagram schematically illustrating an example of a structure of software to be processed by the CPU 211. The software having the structure illustrated in FIG. 3 is, for example, constructed using a program stored in the HDD 213 of the image forming apparatus 101. In FIG. 3, hierarchical layers are in such a relationship that an upper-level hierarchical layer uses a service provided by a lower-level hierarchical layer, aside from some exceptions.

In FIG. 3, a lowermost layer is a hierarchical layer that contains an operating system 316 therein and is in charge of management of execution of a program, memory management, and the like. A printer control driver 317, a scanner control driver 318, and a network I/F control driver 319 are built in the operating system 316. The printer control driver 317, the scanner control driver 318, and the network I/F control driver 319 can function by cooperating with one another. The printer control driver 317 is software for controlling the printer 202 via the printer I/F 215. The scanner control driver 318 is software for controlling the scanner 203 via the scanner I/F 216. The network I/F control driver 319 is software for controlling the network I/F 214.

A device control library 309 is included in a second layer from the lowermost layer. The device control library 309 is statically or dynamically linked to an independent function plug-in application 302, which will be described below, or a device control application 304. Further, the device control library 309 controls the operating system 316 based on an instruction from each application program. Further, each library in the device control library 309 requests image processing to a connection library 314. An example of a flow of a processing sequence of requesting the image processing will be described below.

Next, an example of the device control library 309 will be described.

A print library 310 is a library that provides an application programming interface (API) for controlling a print job with use of the function of the printer control driver 317. The print job refers to a series of processing procedures of printing the print data stored in the HDD 213 of the image forming apparatus 101 or printing the print data received from an external apparatus via the network I/F 214. The external apparatus is, for example, the information processing terminal 103 or 104.

A copy library 311 is a library that provides an API for controlling a copy job with use of the functions of the scanner control driver 318 and the printer control driver 317. The copy job refers to a series of processing procedures of printing the image data scanned by the scanner 203 by the printer 202.

The scan storage library 312 is a library that provides an API for controlling a scan storage job with use of the function of the scanner control driver 318. The scan storage job refers to a series of processing procedures of converting the image data acquired by scanning using the scanner 203 into the print data or a general-purpose format, and then storing the converted data into the HDD 213 or the external storage device connected to the extension I/F 218, such as the USB. The general-purpose format is a data format, such as Portable Document Format (PDF) and Joint Photographic Experts Group (JPEG).

A scan transmission library 313 is a library that provides an API for controlling a scan transmission job with use of the functions of the scanner control driver 318 and the network I/F control driver 319. The scan transmission job refers to a series of processing procedures of converting the image data acquired by scanning using the scanner 203 into the general-purpose format, and then transmitting the converted data to a file server via the network I/F 214 or transmitting the converted data to an external apparatus by attaching it to an electronic mail. The file server is, for example, the server 105, and the external apparatus is, for example, the information processing terminal 103 or 104.

The second layer from the lowermost layer further includes the connection library 314 and an image processing library 315.

The image processing library 315 is a library that provides an API for performing various kinds of image processing to be performed by the CPU 211. The various kinds of image processing here refer to processing usable in the image forming apparatus 101 that is in the factory-shipped state. Examples of this image processing include conversion processing of the image data input to the image forming apparatus 101 into the general-purpose format, sharpness processing, and an N-in-one layout processing. The number of image processing library(ies) 315 may be one, or may be more than one. Each of the image processing library(ies) 315 has an ImagingName 326 as a unique image processing name thereof. For example, the image processing library 315 having a sharpness function has Sharpness as the ImagingName 326 thereof. The ImagingName 326 is used for the connection library 314 to select a suitable module from the image processing library(ies) 315 stored in the HDD 213 and an image processing plug-in application 303, which will be described below.

When receiving a request to perform the image processing from the device control library 309, the connection library 314 selectively calls the image processing library 315 or the image processing plug-in application 303, which will be described below, according to a content of this request, and performs the image processing. An example of a method by which the connection library 314 selectively calls the image processing library 315 or the image processing plug-in application 303, which will be described below, will be described below.

An uppermost layer is an application layer established while including a plug-in application 301 and the device control application 304 therein. The device control application 304 provides various kinds of functions by calling each of the APIs in the device control library 309. The device control application 304 is an application for causing the image forming apparatus 101 to carry out the job. The device control application 304 is a resident application stored in the HDD 213. The device control application 304 can extend a function thereof by a version upgrade of firmware. A print application 305, a copy application 306, a scan storage application 307, and a scan transmission application 308 included in the device control application 304 have screen information 322, screen information 323, screen information 324, and screen information 325, respectively. The CPU 211 displays each piece of the screen information 322, 323, 324, and 325 on the operation unit 204 via the operation unit I/F 217. When detecting a change in a setting of the device control application 304 by the user's operation on the operation unit 204, the CPU 211 writes a content of this change into the HDD 213. The device control application 304 sets an ImagingName into a setting of each job as necessary at this stage. This setting is triggered by, for example, a selection of the image processing that the user makes by pressing the operation unit 204. Alternatively, the CPU 211 can also automatically set the image processing required for each job. Further, the ImagingName can be set by not only the device control application 304 but also the device control library 309. Examples of the case where the device control library 309 sets the image processing name include a case where, with some image processing required when the device control library 309 controls the operating system 316, the device control library 309 sets the image processing name with respect to this image processing. If the number of image processing procedures to be used by the job is more than one, an ImagingName is set in correspondence with each of the image processing procedures (in other words, a plurality of ImagingNames is set). Further, if an application accompanied by the image processing, such as the image processing plug-in application 303, is not selected (i.e., the execution of the image processing is not selected) when the job is carried out, the image processing name is not set. When detecting execution of the job based on the user's operation on the operation unit 204, the CPU 211 (the device control application 304) starts the job by calling the API in the device control library 309.

Next, an example of the device control application 304 will be described. The print application 305 carries out the print job by calling the API of the print library 310. The copy application 306 carries out the copy job by calling the API of the copy library 311. The scan storage application 307 carries out the scan storage job by calling the API of the scan storage library 312. The scan transmission application 308 carries out the scan transmission job by calling the API of the scan transmission library 313.

Next, an example of the plug-in application 301 will be described. The plug-in application 301 is an application installable and uninstallable as a plug-in, separately from the device control application 304, which is the resident application. The plug-in application 301 includes the independent function plug-in application 302 and the image processing plug-in application 303. A program required for an operation of each of them is packaged in the plug-in application 301. The plug-in application 301 is installed in the image forming apparatus 101 using a remote user interface (UI) or the like. The remote UI is a mechanism that allows the user to access the image forming apparatus 101 from a web browser in an external apparatus via the network I/F 214, and, for example, confirm a status of the image forming apparatus 101, operate the print job, and configure various kinds of settings. The external apparatus is, for example, the information processing terminal 103 or 104. Further, each of the applications in the plug-in application 301 (the independent function plug-in application 302 and the image processing plug-in application 303) can be each individually activated and stopped.

In the following description, an example of a flow of a processing sequence from the installation to the activation, the stop, and the uninstallation of the plug-in application 301 will be described.

When detecting the installation of the plug-in application 301, the CPU 211 stores information about this plug-in application 301 into the HDD 213. Subsequently, when detecting a start instruction directed to the plug-in application 301, the CPU 211 issues an activation instruction to this plug-in application 301. The plug-in application 301 can execute a content of each of the programs while being activated. When detecting a stop instruction directed to the plug-in application 301, the CPU 211 issues a stop instruction to this plug-in application 301. Further, when detecting an uninstallation instruction directed to the plug-in application 301, the CPU 211 deletes the information about this plug-in application 301 from the HDD 213. These instructions can be issued from, for example, the remote UI or the operation unit 204, but may be issued by a method other than them.

Next, an example of the independent function plug-in application 302 will be described. The independent function plug-in application 302 has screen information 320. The independent function plug-in application 302 operates independently of the device control application 304. The independent function plug-in application 302 can provide a function and screen different from those of the resident device control application 304 to the user by calling the API of the device control library 309. For example, the independent function plug-in application 302 can combine and then provide a plurality of functions, such as the functions of copying image data and also scanning and transmitting this image data. Further, when detecting that the image processing is set based on the user's operation performed onto the screen information 320, the independent function plug-in application 302 sets an ImagingName into the setting of the job as the image processing name corresponding to this image processing. The independent function plug-in application 302 can set an ImagingName of the image processing desired to be executed by default even without the image processing explicitly set by the user. The independent function plug-in application 302 does not necessarily have the function of performing the image processing. In this case, the image processing is not set. The connection library 314 selects a required image processing module based on the Imaging Name set in this manner, and performs the image processing. An example of a method for selecting the image processing module will be described below. Further, when receiving the print data, or the image data after the conversion into the general-purpose format, the device control library 309 instructs the appropriate operating system 316 to control the processing to cause the appropriate operating system 316 to carry out the job.

Next, an example of the image processing plug-in application 303 will be described. The image processing plug-in application 303 is an application that provides specific image processing. The image processing plug-in application 303 is an application that extends the device control application 304. The image processing plug-in application 303 is executed in conjunction with the execution of the device control application 304. The number of image processing plug-in application(s) 303 may be one or more than one. The specific image processing here refers to image processing extended separately from the image processing library 315. Examples of the specific image processing include a conversion of a format of an input image, a tilt correction, and generation of translated data after optical character recognition (OCR).

The image processing plug-in application 303 does not necessarily have the image processing function in itself. For example, a case where a program for the image processing is provided the server 105, the image processing plug-in application 303 can implement the image processing by transmitting an instruction for the image processing to the server 105 (the external server) via the network I/F 214. Each of the image processing plug-in application(s) 303 has an ImagingName 321 as an identifier for identifying a content of the image processing to be performed by this image processing plug-in application 303 itself. For example, "TiltCorrect" is set to the image processing plug-in application 303 that performs the tilt correction as the ImagingName 321 thereof. The ImagingName 321 is unique, and a plurality of image processing plug-in applications 303 having the same ImagingName 321 does not exist in the HDD 213 of the image forming apparatus 101. In other words, the image processing plug-in application 303 having the same ImagingName 321 as the image processing plug-in application 303 already installed in the image forming apparatus 101 cannot be installed in the image forming apparatus 101. When requesting the image processing to the connection library 314, the device control library 309 sets the ImagingName and detailed parameters of the processing. The connection library 314 can selectively call the image processing plug-in application 303 or the image processing library 315 based on the ImagingName set to the job. An example of details of a method for selectively calling them will be described below. A portion for which the connection library 314 requests the processing to the image processing plug-in application 303 is a portion for which a lower-level module can call an upper-level module in FIG. 3. The image forming apparatus 101 can recognize the image processing plug-in application 303 by the installation of the image processing plug-in application 303 into the image forming apparatus 101 and the activation of the image processing plug-in application 303 with use of the remote UI or the like, similarly to the plug-in application 301.

In the above-described example, the device control application 304 is stored in the HDD 213, and thus an example of first storage processing for storing a first application which is used for the image forming apparatus 101 to carry out the job is implemented. Further, the image processing library 315 and the ImagingName 326 are stored in the HDD 213, and thus an example of second storage processing is implemented. Further, the plug-in application 301 stored in the external storage medium or storage device is installed, and thus an example of acquisition processing for acquiring a third application to be used to cause the image forming apparatus 101 or the external apparatus to perform the processing is implemented. Furthermore, the installed plug-in application 301 is stored in the HDD 213, and thus an example of third storage processing is implemented. The information may be stored in a storage medium or a storage device other than the HDD 213.

Figure 4:
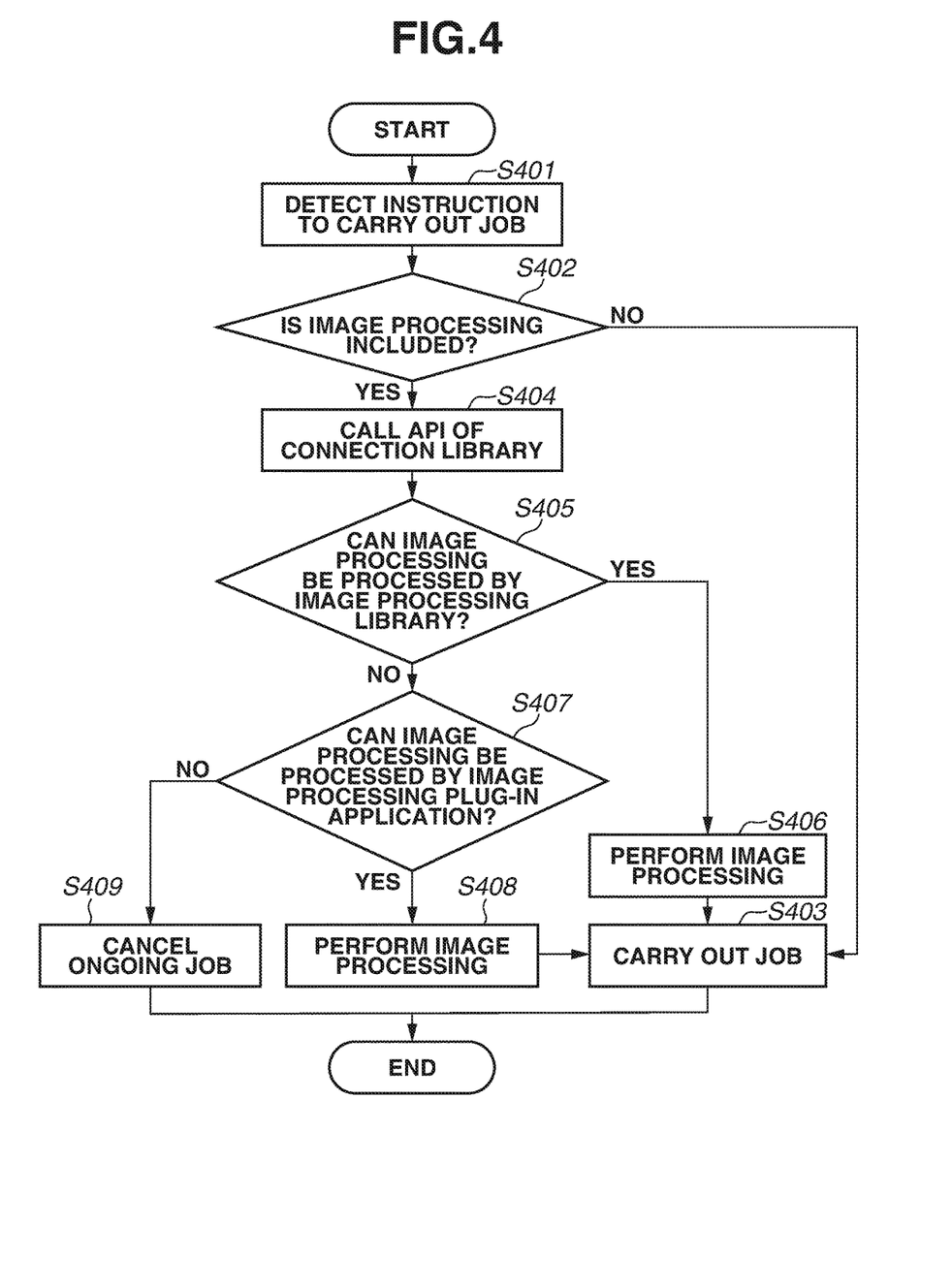
FIG. 4 is a flowchart illustrating processing performed by the image forming apparatus when a job is carried out according to the first exemplary embodiment according to one embodiment.

FIG. 4 is a flowchart illustrating an example of the processing performed by the image forming apparatus 101 when the job is carried out. A program relating to the processing illustrated in the present flowchart is stored in the HDD 213 of the image forming apparatus 101, and is called by the RAM 212 and executed by the CPU 211. A flow of a series of processes when the job is carried out will be described with reference to FIGS. 3 and 4.

A job includes a setting value of the job and image data to be handled in the job. An ImagingName can be set in a setting value of a job as the image processing name of the image processing to be performed in the job.

In step S401, the CPU 211 detects an instruction to carry out a job from the operation unit I/F 217 in the device control application 304. Then, the CPU 211 determines whether there is image processing required to be performed by any of the applications when this job is carried out. If there is image processing required to be performed by any of the applications, the CPU 211 sets an ImagingName of the image processing as the setting value of the job. Alternatively, the user may set the image processing to be required when the job is carried out to the image forming apparatus 101 before issuing the instruction to carry out the job. The image forming apparatus 101 may prestore therein a content of the image processing to be required when a job having a predetermined content is carried out, and the CPU 211 may call the image processing when an instruction to carry out the job having the predetermined content is issued.

Subsequently, the CPU 211 calls the API in the device control library 309. If there is image processing required to be performed in the control of each device when this job is carried out, the device control library 309 called by the CPU 211 adds an ImagingName of the image processing as the setting value of the job. In this manner, even the device control library 309 can set an ImagingName after the instruction to carry out the job is issued. Subsequently, in step S402, the device control library 309 determines whether image processing is included in the job based on whether an ImagingName is set in the setting value of the job. More specifically, in a case where an ImagingName is set in the setting value of the job, the device control library 309 determines that image processing is included in the job (YES in step S402). Then, in a case where an ImagingName is not set in the setting value of the job, the device control library 309 determines that no image processing is included in the job (NO in step S402).

In a case where a determination is made that no image processing is included in the job (NO in step S402), the processing proceeds to step S403. In step S403, the device control library 309 issues a control request to a driver required for the job in the operating system 316 to cause the driver to carry out the job. Then, the processing according to the flowchart illustrated in FIG. 4 is ended.

In a case where a determination is made that image processing is included in the job (YES in step S402), step S404, the device control library 309 calls the API of the connection library 314. In step S405, the connection library 314 determines whether the image processing indicated by the ImagingName set in the setting value of the job can be implemented by the image processing library 315. An example of a method for this determination will be described next.

In a first determination method, first, the connection library 314 acquires a list of ImagingName(s) 326 from the image processing library(ies) 315 as the name of the image processing that can be performed by each of the image processing library(ies) 315. Then, the connection library 314 compares the ImagingName received from the device control library 309 and each ImagingName 326 included in the list of ImagingName(s) 326. In other words, the connection library 314 determines whether there is an ImagingName 326 matching the ImagingName received from the device control library 309 among the ImagingName(s) 326 included in the list of ImagingName(s) 326. If there is an ImagingName 326 matching the ImagingName received from the device control library 309, the connection library 314 determines that the image processing indicated by the ImagingName set in the setting value of the job can be implemented by the image processing library 315 (YES in step S405). Meanwhile, in a case where there is not an ImagingName 326 matching the ImagingName received from the device control library 309, the connection library 314 determines that the image processing indicated by the ImagingName set in the setting value of the job cannot be implemented by the image processing library 315 (NO in step S405).

In a second determination method, first, the connection library 314 requests the image processing library 315 to perform the image processing indicated by the ImagingName received from the device control library 309. Then, in a case where the image processing indicated by the ImagingName received from the device control library 309 can be performed by the image processing library 315, the connection library 314 determines that the image processing can be implemented by the image processing library 315 (YES in step S405). Meanwhile, in a case where the image processing indicated by the ImagingName received from the device control library 309 cannot be performed by the image processing library 315, the connection library 314 determines that the image processing cannot be implemented by the image processing library 315 (NO in step S405).

In the above-described first determination method and second determination method, the connection library 314 determines whether the image processing indicated by the ImagingName set in the setting value of the job can be implemented by the image processing library 315 with use of a result of communication with the image processing library 315. The method for determining whether the image processing indicated by the ImagingName set in the setting value of the job can be implemented by the image processing library 315 may be a method other than the above-described first determination method and second determination method.

If the determination is made that the image processing can be implemented by the image processing library 315 (YES in step S405), the processing proceeds to step S406. In step S406, the connection library 314 calls the API of the image processing library 315 to cause the API to perform the image processing, and then transmits image data subjected to the image processing to the device control library 309. In step 403, the device control library 309 issues the control request to the driver required for the job in the operating system 316 to cause the driver to carry out the job. Then, the processing according to the flowchart illustrated in FIG. 4 is ended.

In a case where the determination is made that the image processing cannot be implemented by the image processing library 315 (NO in step S405), the processing proceeds to step S407. In step S407, the connection library 314 determines whether the image processing can be implemented by the image processing plug-in application 303. An example of a method for this determination will be described below. In a case where the image processing can be implemented by the image processing plug-in application 303 (YES in step S407), the processing proceeds to step S408. In step S408, the connection library 314 issues a processing request to the API of this image processing plug-in application 303 to cause the API to perform the image processing. Then, after receiving image data subjected to the image processing by the image processing plug-in application 303, in step S403, the device control library 309 issues the control request to the driver required for the job in the operating system 316 to cause the driver to carry out the job. Then, the processing according to the flowchart illustrated in FIG. 4 is ended.

Meanwhile, in a case where the connection library 314 determines that this image processing cannot be implemented by the image processing plug-in application 303 (NO in step S407), the processing proceeds to step S409. In step S409, the CPU 211 displays, on the operation unit 204, information indicating that the job cannot be carried out because the image processing is not executable, and cancels the ongoing job. Then, the processing according to the flowchart illustrated in FIG. 4 is ended.

In FIG. 4, the connection library 314 first determines whether the image processing can be implemented by the image processing library 315, and then determines whether this image processing can be implemented by the image processing plug-in application 303 (steps S405 and S407), by way of example. However, the connection library 314 may first determine whether the image processing can be implemented by the image processing plug-in application 303, and then determine whether this image processing can be implemented by the image processing library 315 in an opposite order from the above-described example.

In the example illustrated in FIG. 4, an example of selection processing is implemented by, for example, the determinations made in steps S405 and S407. Further, an example of control processing is implemented by, for example, the image processing performed in step S406 or S408.

Next, a description will be given for an example of the method for determining whether the image processing plug-in application 303 can implement the image processing indicated by the ImagingName set in the setting value of the job (i.e., the method for the determination in step S407).

Figure 5:
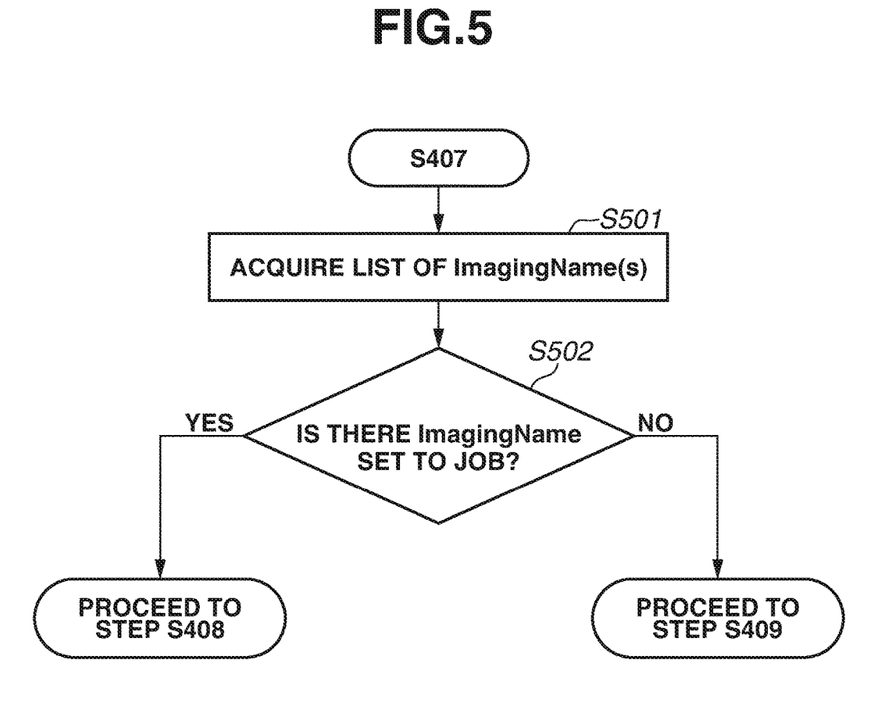
FIG. 5 is a flowchart illustrating an example a first determination method according to one embodiment.

FIG. 5 is a flowchart illustrating a first determination method for determining whether the image processing plug-in application 303 can implement the image processing indicated by the ImagingName set in the setting value of the job (a first determination method in step S407). In a case where the connection library 314 determines that the image processing indicated by the ImagingName set in the setting value of the job cannot be implemented by the image processing library 315 in step S405 (NO in step S405), execution of the flowchart illustrated in FIG. 5 is started.

In step S501, the connection library 314 acquires the list of ImagingName(s) 321 respectively associated with the image processing plug-in application (s) 303 registered with the image forming apparatus 101. Subsequently, in step S502, the connection library 314 determines whether there is the ImagingName set in the setting value of the job in this list. In a case where a determination is made that there is the ImagingName set in the setting value of the job (YES in step S502), the connection library 314 performs the process in the above-described step, step S408. More specifically, in step S408, the connection library 314 issues the processing request to the API of the image processing plug-in application 303 having the ImagingName 321 matching the ImagingName set in the setting value of the job to cause the API to perform the image processing. Meanwhile, in a case where a determination is made that there is not an ImagingName set in the setting value of the job (NO in step S502), the connection library 314 determines that the image processing indicated by this ImagingName cannot be performed by the image processing plug-in application 303 (NO in step S407). In step S409, as described above, the CPU 211 displays, on the operation unit 204, the information indicating that the job cannot be carried out because this image processing is not executable, and cancels the ongoing job.

Figure 6:
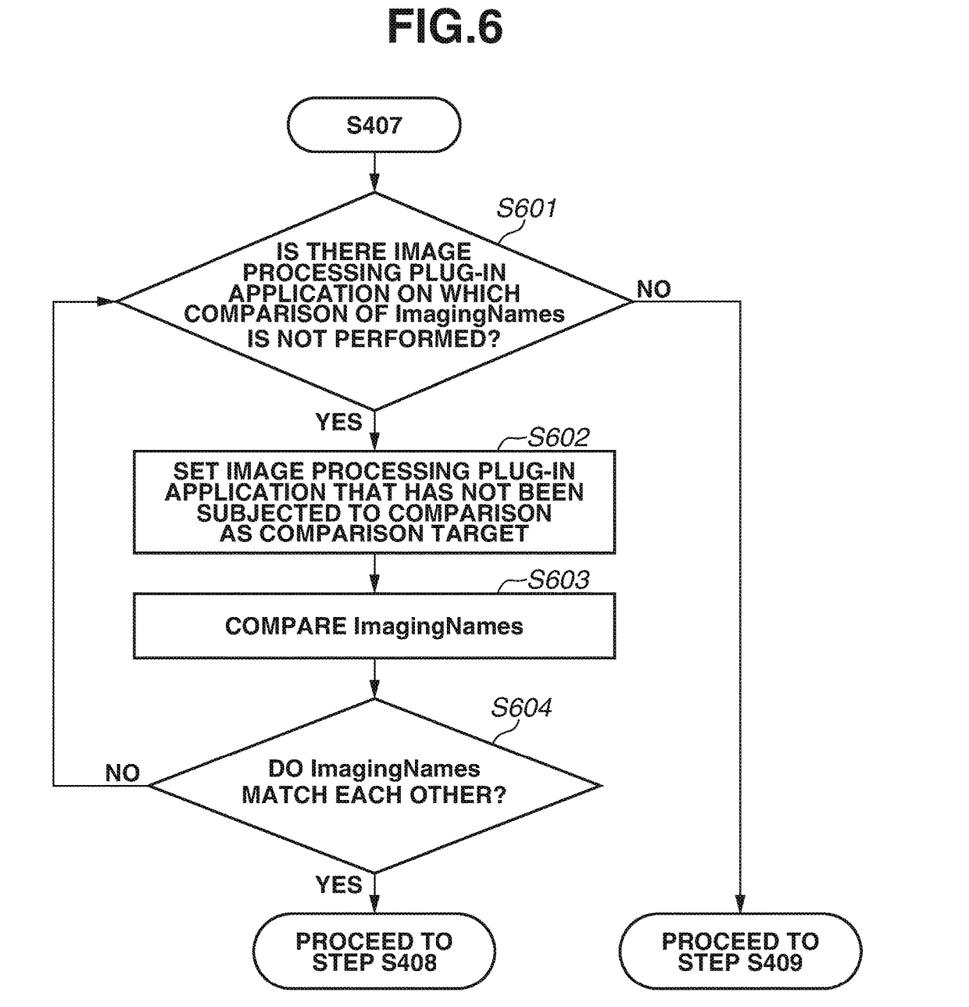
FIG. 6 is a flowchart illustrating an example a second determination method according to one embodiment.

FIG. 6 is a flowchart illustrating a second determination method for determining whether the image processing plug-in application 303 can implement the image processing indicated by the ImagingName set in the setting value of the job (a second determination method in step S407). Similarly to FIG. 5, execution of the flowchart illustrated in FIG. 6 is started when the connection library 314 determines that the image processing indicated by the ImagingName set in the setting value of the job cannot be implemented by the image processing library 315 in step S405 (NO in step S405).

In step S601, the connection library 314 determines whether there is the image processing plug-in application 303 on which comparison of ImagingNames is not performed. This comparison refers to a comparison between the ImagingName of the image processing requested from the device control library 309 (i.e., the ImagingName as the setting value of the job) and the ImagingName 321s) held by the image processing plug-in application 303.

If there is not the image processing plug-in application 303 on which the comparison of ImagingNames is not performed (NO in step S601), the connection library 314 determines that the image processing indicated by the ImagingName cannot be performed by the image processing plug-in application 303 (NO in step S407). In step S409, as describe above, the CPU 211 displays the information indicating that the job cannot be carried out because the image processing is not executable, and cancels the ongoing job.

Meanwhile, in a case where there is an image processing plug-in application 303 on which the comparison of ImagingNames is not performed (YES in step S601), the processing proceeds to step S602. Then, in step S602, the connection on library 314 sets the image processing plug-in application 303 that has not yet been subjected to the comparison of ImagingNames as a target of the comparison. Then, in step S603, the connection library 314 compares the ImagingName 321 held by the image processing plug-in application 303 targeted for the comparison, and the ImagingName set in the setting value of the job. In step S604, the connection library 314 determines whether the ImagingName 321 held by the image processing plug-in application 303 targeted for the comparison and the ImagingName set in the setting value of the job match each other. In a case where a determination is made that these ImagingNames match each other (YES in step S604), the connection library 314 performs the process in the above-described step, step S408. More specifically, in step S408, the connection library 314 issues the processing request to the API of the image processing plug-in application 303 having the ImagingName 321 matching the ImagingName set in the setting value of the job to cause the API to perform the image processing. Meanwhile, in a case where a determination is made that these ImagingNames do not match each other (NO in step S604), the processing returns to step S601. Then, in step S601, the connection library 314 determines whether there is the image processing plug-in application 303 on which the comparison of ImagingNames is not performed.

In the above-described manner, according to the first exemplary embodiment, the image forming apparatus 101 stores an ImagingName 321 in association with an image processing plug-in application 303 as identification information of image processing implemented by the image processing plug-in application 303. Further, the image forming apparatus 101 stores the ImagingName 326, which is the identification information of the image processing to be used by the function (such as printing) implemented by the device control application 304. The connection library 314 searches for an ImagingName matching the ImagingName set to the job from the ImagingName(s) 321 and 326. Then, the connection library 314 requests the image processing associated with the discovered ImagingName to the image processing plug-in application 303 or the image processing library 315. Consequently, the present exemplary embodiment allows the image forming apparatus 101 to extend the function of the resident device control application 304 by the installation of the image processing plug-in application 303 as new image processing. Accordingly, the user can use the new image processing from the device control application 304. As a result, the image forming apparatus 101 is allowed to carry over the settings of the device control application 304 when using the new image processing, which allows the image forming apparatus 101 to carry over settings of various kinds of existing job functions with no change made thereto. Therefore, the user's convenience is improved.

The first exemplary embodiment has been described based on the example in which the device control library 309 calls the API of the connection library 314.

A second exemplary embodiment will be described using an example in which the device control library 309 selects the library to call from the image processing library 315 and the connection library 314.

A hardware configuration of an image forming system according to the present exemplary embodiment is similar to the content described in the first exemplary embodiment, and therefore a description thereof will be omitted below.

Figure 7:
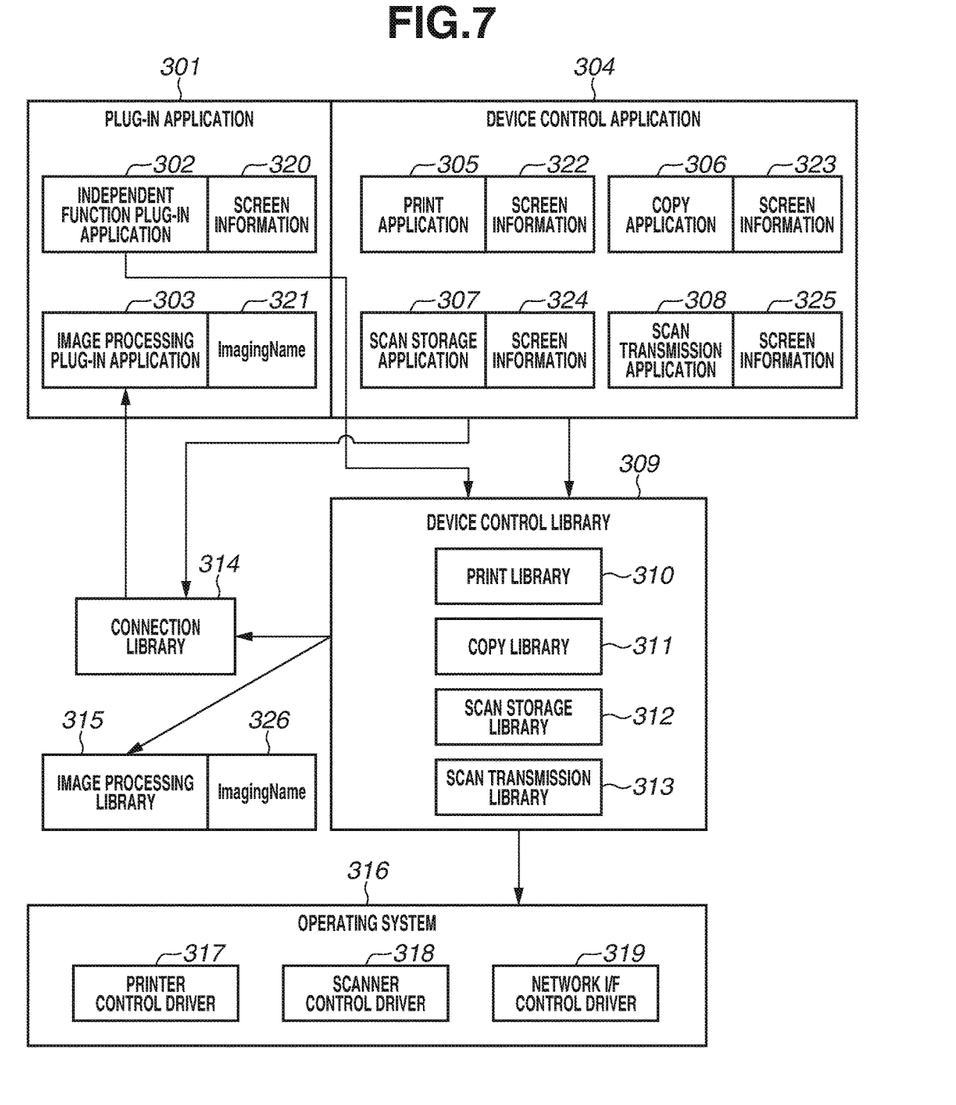
FIG. 7 illustrates a software structure of an image forming apparatus according to a second exemplary embodiment according to one embodiment.

A software configuration according to the present exemplary embodiment will be described with reference to FIG. 7. The configuration illustrated in FIG. 7 is different from the configuration illustrated in FIG. 3 in terms of a relation line drawn directly from the device control library 309 to the image processing library 315 without passing through the connection library 314. Other configurations are similar to the content described with reference to FIG. 3, and therefore descriptions thereof will be omitted below.

Figure 8:
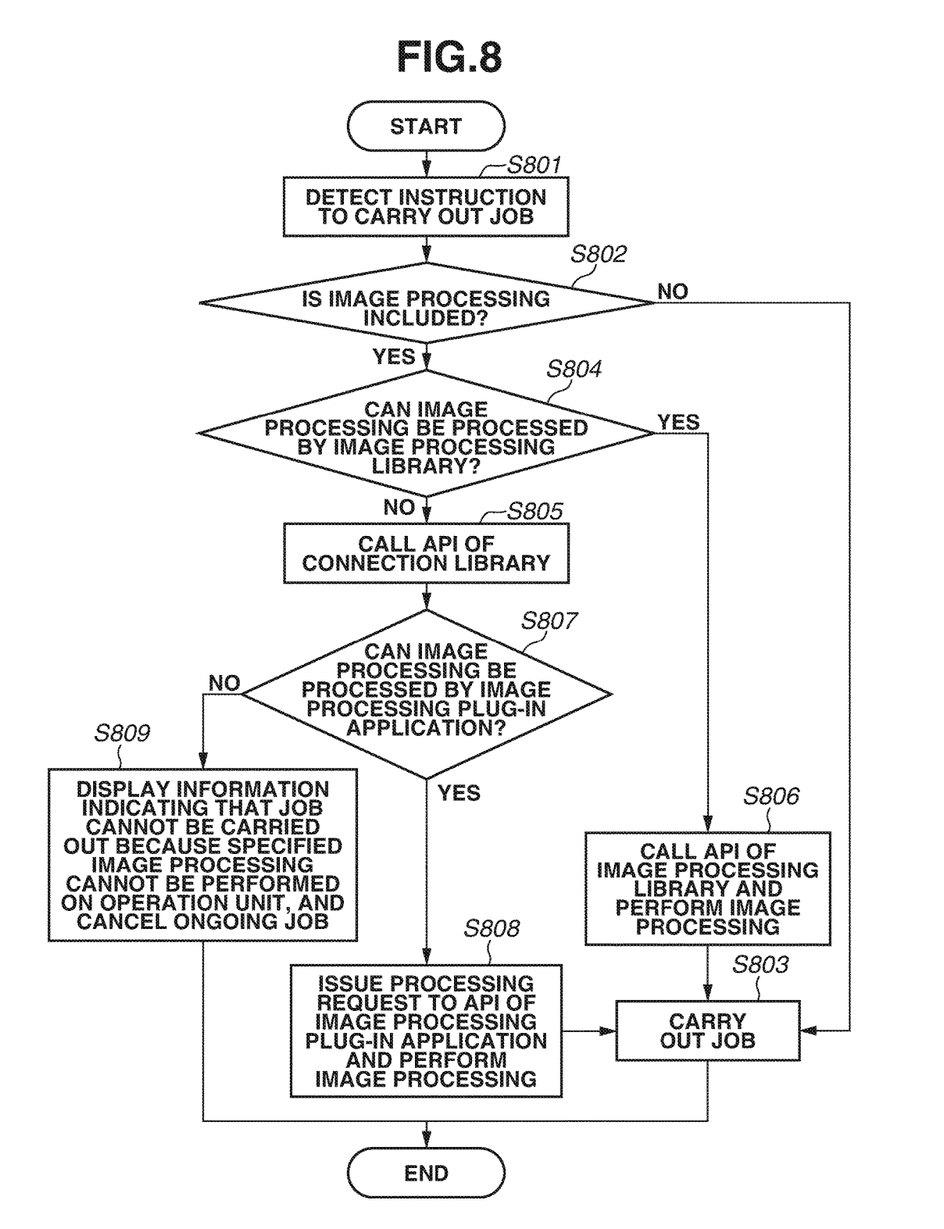
FIG. 8 is a flowchart illustrating processing performed by the image forming apparatus when a job is carried out according to the second exemplary embodiment according to one embodiment.

Next, a procedure for carrying out a job according to the present exemplary embodiment will be described with reference to a flowchart illustrated in FIG. 8. A program relating to the processing illustrated in the present flowchart is stored in the HDD 213 of the image forming apparatus 101, and is called by the RAM 212 and executed by the CPU 211.

In processes in steps S801, S802, and S803 are similar to the processes in steps S401, S402, and S403 according to the first exemplary embodiment, respectively, and therefore descriptions thereof will be omitted below.

In a case where a determination is made that the image processing is included in the job (YES in step S802), the processing proceeds to step S804. In step S804, the device control library 309 determines whether the image processing indicated by the ImagingName set to the job can be processed by the image processing library 315. In a case where a determination is made that this image processing can be processed by the image processing library 315 (YES in step S804), the processing proceeds to step S806. In step S806, the device control library 309 calls the API of the image processing library 315 and performs the image processing. After the device control library 309 performs the process in step S806, the processing proceeds to step S803, in which the device control library 309 carries out the job. Then, the processing is ended.

Meanwhile, in a case where a determination is made that the image processing cannot be processed by the image processing library 315 in step S804 (NO in step S804), the processing proceeds to step S805. In step S805, the device control library 309 calls the API of the connection library 314. After the device control library 309 performs the process in step S805, the processing proceeds to a process in step S807.

The processes in steps S807, S808, and S809 are similar to the processes in steps S407, S408, and S409 according to the first exemplary embodiment, respectively, and therefore descriptions thereof will be omitted here.

Such a configuration also allows the image forming apparatus 101 to extend the function of the resident device control application 304 by the installation of the image processing plug-in application 303. The user can use the new image processing from the device control application 304. As a result, the image forming apparatus 101 is allowed to carry over the settings of the device control application 304 when using the new image processing, which allows the image forming apparatus 101 to carry over the settings of the various kinds of existing job functions with no change made thereto. Therefore, the user's convenience is improved.

A third exemplary embodiment will be described using an example in which the independent function plug-in application 302 calls the image processing plug-in application 303 without the intervention of the device control library 309. In the present exemplary embodiment, the image processing plug-in application 303 extends the function of the independent function plug-in application 302. In the present exemplary embodiment, the image processing plug-in application 303 is executed in conjunction with the execution of the independent function plug-in application 302.

A hardware configuration of an image forming system according to the present exemplary embodiment is similar to the content described in the first exemplary embodiment, and therefore a description thereof will be omitted below.

Figure 9:
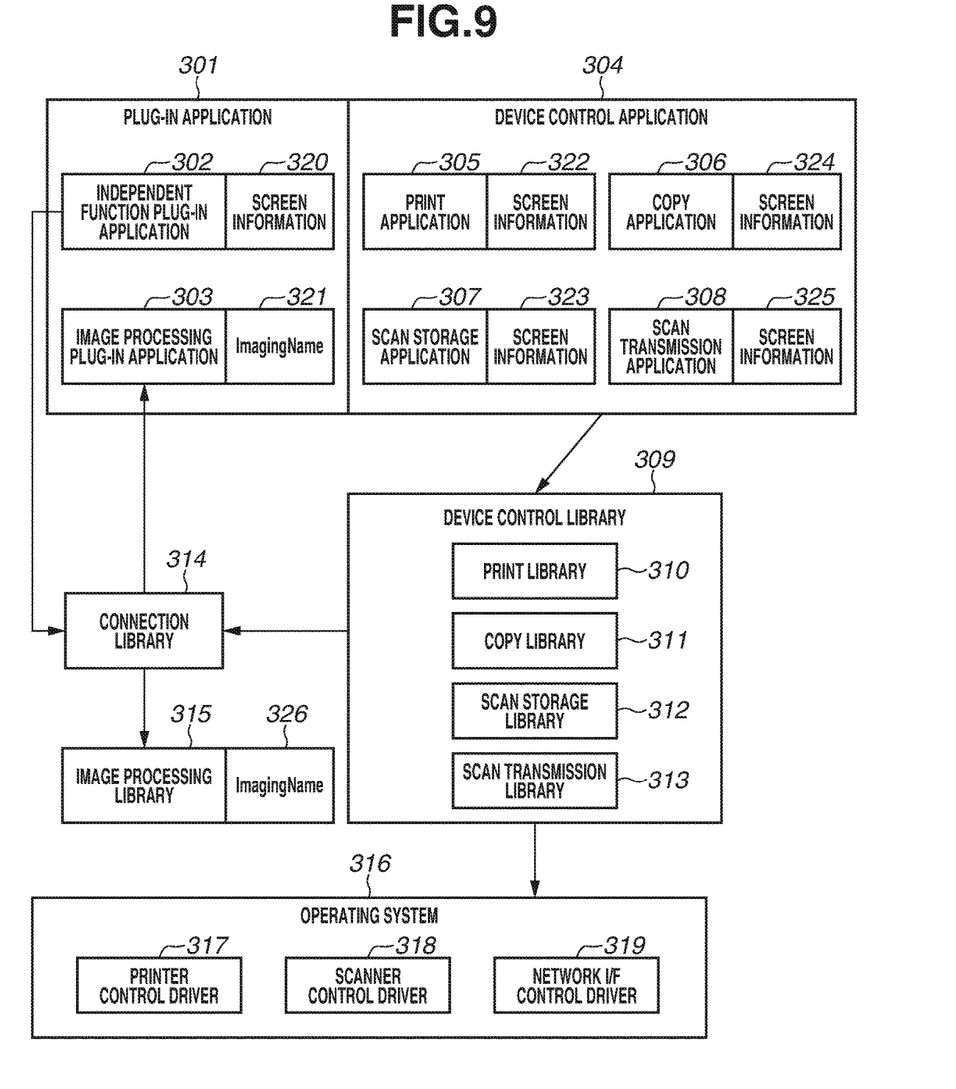
FIG. 9 illustrates a software structure of an image forming apparatus according to a third exemplary embodiment according to one embodiment.

A software configuration according to the present exemplary embodiment will be described with reference to FIG. 9. The configuration illustrated in FIG. 9 is different from the configuration illustrated in FIG. 3 in terms of a relation line drawn from the independent function plug-in application 301 to the connection library 314. Other configurations are similar to the content described with reference to FIG. 3, and therefore descriptions thereof will be omitted below.

The configuration in which the device control library 309 directly calls the image processing library 315 without the intervention of the connection library 314 may be applied to the present exemplary embodiment, similarly to the configuration described in the second exemplary embodiment with reference to FIG. 7.

Further, in the present exemplary embodiment, the independent function plug-in application 302 can also perform the image processing by itself without being accompanied by the processing performed by the device control application 304. For example, an example in which the OCR processing is performed will be described as an example in which the independent function plug-in application 302 performs the image processing without being accompanied by the processing performed by the device control application 304. The independent function plug-in application 302 can perform processing of detecting a document containing a specific word therein among a plurality of documents stored in a specific storage area in the image forming apparatus 101 and displaying a result of the detection.

Such processing is not accompanied by the processing performed by the device control application 304, and can be performed by the independent function plug-in application 302. As described in the first exemplary embodiment, the device control application 304 includes, for example, the print application 305, the copy application 306, the scan storage application 307, and the scan transmission application 308.

Figure 10:
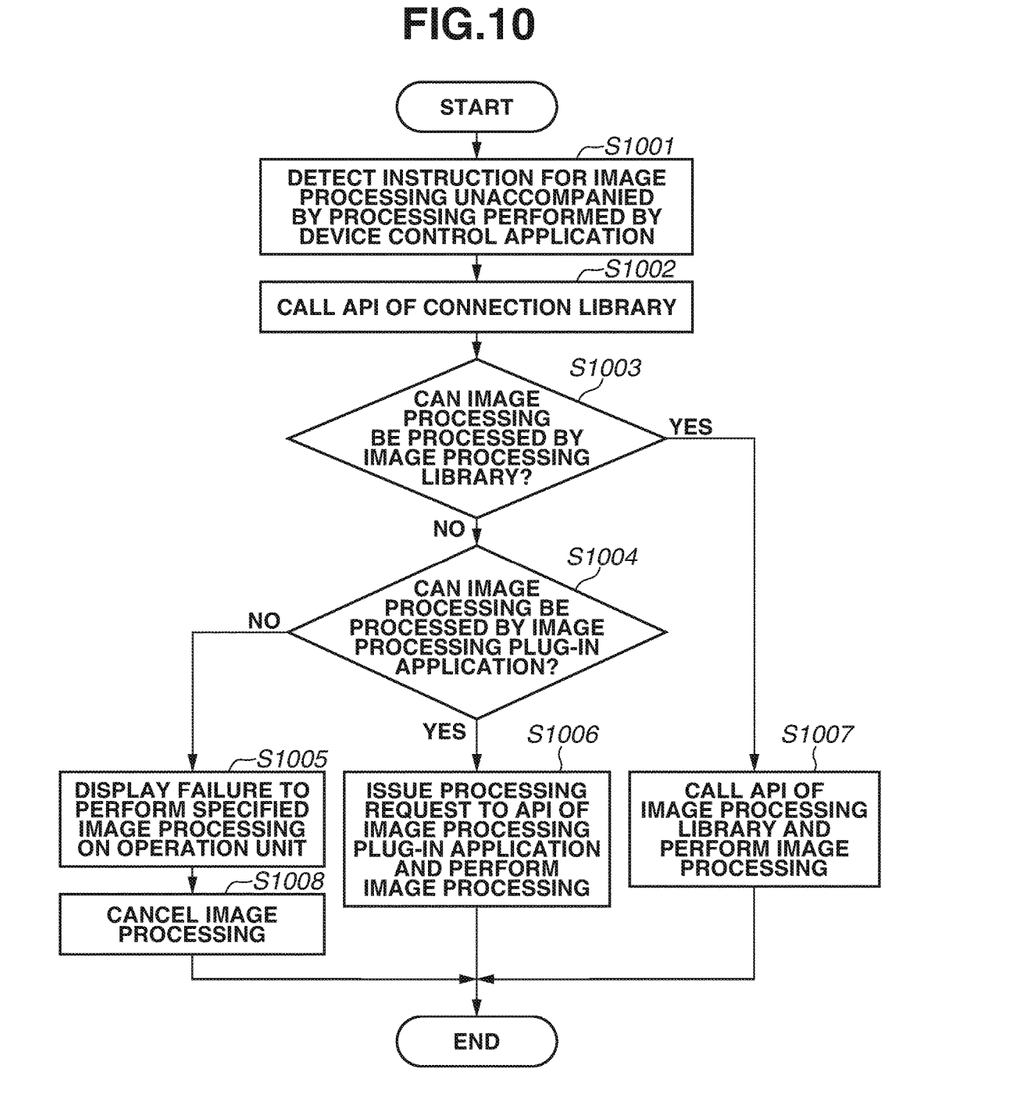
FIG. 10 is a flowchart illustrating an example in which an independent function plug-in application according to the third exemplary embodiment performs image processing according to one embodiment.

Next, a procedure for performing the image processing according to the present exemplary embodiment will be described with reference to a flowchart illustrated in FIG. 10. A program relating to the processing illustrated in the present flowchart is stored in the HDD 213 of the image forming apparatus 101, and is called by the RAM 212 and executed by the CPU 211.

In step S1001, the independent function plug-in application 302 detects that the image processing unaccompanied by the processing performed by the device control application 304 is set. Then, the independent function plug-in application 302 sets an ImagingName to the name of the image processing.

Subsequently, in step S1002, the independent function plug-in application 302 directly calls the API the connection library 314. In step S1003, the connection library 314 determines whether the image processing called by the independent function plug-in application 302 can be processed by the image processing library 315. The determination in step S1003 can be made based on the image processing name of the called image processing. In a case where a determination is made that the image processing can be processed by the image processing library 315 (YES in step S1003), the processing proceeds to step S1007. In step S1007, the connection library 314 calls the API of the image processing library 315 and performs the image processing. Then, the processing is ended.

In a case where a determination is made that the image processing cannot be processed by the image processing library 315 (NO in step S1003), the processing proceeds to step S1004. In step S1004, the connection library 314 determines whether the image processing can be processed by the image processing plug-in application 303. In a case where a determination is made that the image processing can be processed by the image processing plug-in application 303 (YES in step S1004), the connection library 314 performs the following processing. That is, in step S1006, the connection library 314 issues a processing request to the API of the image processing plug-in application 303, and performs the image processing. Then, the processing is ended.

In step S1004, in a case where a determination is made that the image processing cannot be processed by the image processing library 315 (NO in step S1004), the processing proceeds to step S1005. In step S1005, the connection library 314 displays the failure to perform the specified image processing on the operation unit 204. Then, in step S1008, the connection library 314 cancels the ongoing image processing.

The present exemplary embodiment may be configured in such a manner that the independent function plug-in application 302 receives the reason why the image processing cannot be performed from the connection library 314, and the independent function plug-in application 302 displays the reason why the image processing cannot be performed on the operation unit 204.

Details of the process for determining whether the image processing can be processed by the image processing library 315 (step S1003) and the process for determining whether the image processing can be processed by the image processing plug-in application 303 (step S1004) are similar to the first exemplary embodiment, and therefore descriptions thereof will be omitted here.

According to the present exemplary embodiment, the image forming apparatus 101 allows the user to use the added image processing plug-in application 303 even for the independent image processing unaccompanied by the processing performed by the device control application 304, in the independent function plug-in application 302. In other words, the function of the independent function plug-in application 302 can be extended by the image processing plug-in application 303.

All the first to third exemplary embodiments merely indicate examples of how to embody embodiments of the present disclosure when implementing the present invention, and the technical scope of the present disclosure should not be construed to be limited by these embodiments. In other words, various embodiments can be implemented in various ways without departing from the technical idea thereof or the main features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-140829, filed Jul. 20, 2017, and Japanese Patent Application No. 2016-146628, filed Jul. 26, 2016, which are hereby incorporated by reference herein in their entirety.

What is claimed is:

1. An image forming apparatus comprising:
a storage storing a device control application for causing the image forming apparatus to carry out a job;
a memory device that stores a set of instructions; and
at least one processor that executes the instructions to:
perform control to store on the storage an image processing plug-in application for extending the device control application;
provide a connection library for executing the image processing plug-in application in conjunction with execution of the device control application; and
perform control to store on the storage an independent function plug-in application operable independently of the device control application,
wherein the image processing plug-in application extends also the independent function plug-in application,
wherein the provided connection library is used also by the independent function plug-in application for executing the image processing plug-in application in conjunction with execution of the independent function plug-in application,
wherein, in a case where a request for executing image processing is received from the device control application, the provided connection library selectively calls an image processing library or the image processing plug-in application depending on content of the request, and
wherein, in a case where a request for executing image processing is received from the independent function plug-in application, the provided connection library selectively calls the image processing library or the image processing plug-in application depending on content of the request.

2. The image forming apparatus according to claim 1, wherein the image processing plug-in application performs processing for instructing an external server to perform image processing in conjunction with execution of processing by the device control application.

3. The image forming apparatus according to claim 1, wherein the device control application is any of a print application, a copy application, a scan storage application, and a scan transmission application.

4. The image forming apparatus according to claim 1, wherein the image processing plug-in application performs any processing among a conversion of a format of an input image, a tilt correction, and generation of translated data after optical character recognition (OCR), in conjunction with execution of processing by the device control application.

5. A method for controlling an image processing apparatus configured to store a device control application on a storage, the method comprising:
   performing control for storing on the storage an image processing plug-in application for extending the device control application;
   providing a connection library for executing the image processing plug-in application in conjunction with execution of the device control application; and
   performing control to store on the storage an independent function plug-in application operable independently of the device control application,
   wherein the image processing plug-in application extends also the independent function plug-in application,
   wherein the provided connection library is used also by the independent function plug-in application for executing the image processing plug-in application in conjunction with execution of the independent function plug-in application,
   wherein, in a case where a request for executing image processing is received from the device control application, the provided connection library selectively calls an image processing library or the image processing plug-in application depending on content of the request, and
   wherein, in a case where a request for executing image processing is received from the independent function plug-in application, the provided connection library selectively calls the image processing library or the image processing plug-in application depending on content of the request.

6. A non-transitory computer readable storage medium storing a program which, when executed, causes an image processing apparatus to perform a process, the image processing apparatus configured to store a device control application on a storage, and the process comprising:
   performing control for storing on the storage an image processing plug-in application for extending the device control application;
   providing a connection library for executing the image processing plug-in application in conjunction with execution of the device control application; and
   performing control to store on the storage an independent function plug-in application operable independently of the device control application,
   wherein the image processing plug-in application extends also the independent function plug-in application,
   wherein the provided connection library is used also by the independent function plug-in application for executing the image processing plug-in application in conjunction with execution of the independent function plug-in application,
   wherein, in a case where a request for executing image processing is received from the device control application, the provided connection library selectively calls an image processing library or the image processing plug-in application depending on content of the request, and
   wherein, in a case where a request for executing image processing is received from the independent function plug-in application, the provided connection library selectively calls the image processing library or the image processing plug-in application depending on content of the request.

* * * * *